(12) United States Patent
Chueh et al.

(10) Patent No.: US 8,140,879 B2
(45) Date of Patent: Mar. 20, 2012

(54) SYSTEM AND METHOD FOR INFORMATION HANDLING SYSTEM POWER MANAGEMENT BY VARIABLE DIRECT CURRENT INPUT

(75) Inventors: Yung Fa Chueh, Taipei Hsien (TW); Wen-Hung Huang, Taipei (TW); So-Yu Weng, Taipei County (TW); Wen-Yung Chang, Taoyan Hsien (TW)

(73) Assignee: Dell Products L.P., Round Rock, TX (US)

( * ) Notice: Subject to any disclaimer, the term of this patent is extended or adjusted under 35 U.S.C. 154(b) by 448 days.

(21) Appl. No.: 12/355,045

(22) Filed: Jan. 16, 2009

(65) Prior Publication Data

US 2010/0185877 A1   Jul. 22, 2010

(51) Int. Cl.
    G06F 1/26    (2006.01)
(52) U.S. Cl. .......................................... 713/340; 713/300
(58) Field of Classification Search ................... 713/300
     See application file for complete search history.

(56) References Cited

U.S. PATENT DOCUMENTS

| | | | |
|---|---|---|---|
| 5,684,382 A | | 11/1997 | Fritz et al. |
| 5,811,895 A * | | 9/1998 | Suzuki et al. .................. 307/125 |
| 5,886,424 A * | | 3/1999 | Kim .................. 307/64 |
| 6,272,642 B2 | | 8/2001 | Pole et al. |
| 6,741,066 B1 * | | 5/2004 | Densham et al. ............. 320/145 |
| 6,828,760 B2 * | | 12/2004 | Massey et al. ................. 320/127 |
| 6,879,497 B2 | | 4/2005 | Hua et al. |
| 6,950,950 B2 * | | 9/2005 | Sawyers et al. ............... 713/300 |
| 7,363,522 B2 * | | 4/2008 | Prosperi ........................ 713/300 |
| 7,366,924 B2 * | | 4/2008 | Hupman et al. ............... 713/300 |
| 7,392,410 B2 * | | 6/2008 | Allen et al. .................... 713/310 |
| 7,581,130 B2 * | | 8/2009 | Carroll et al. ................. 713/340 |
| 7,646,168 B2 * | | 1/2010 | Tseng et al. .................. 320/114 |
| 7,911,817 B2 * | | 3/2011 | Kasprzak et al. ............. 363/146 |
| 2003/0126474 A1 * | | 7/2003 | Sawyers et al. ............... 713/300 |
| 2005/0270812 A1 | | 12/2005 | Vinciarelli |
| 2006/0085658 A1 * | | 4/2006 | Allen et al. .................... 713/310 |
| 2007/0016806 A1 * | | 1/2007 | Prosperi ........................ 713/300 |
| 2007/0019347 A1 * | | 1/2007 | Tseng et al. .................... 361/90 |
| 2007/0096692 A1 * | | 5/2007 | Chuang et al. ................ 320/128 |
| 2007/0229024 A1 * | | 10/2007 | Li et al. ......................... 320/111 |
| 2010/0067268 A1 * | | 3/2010 | Kasprzak et al. ............. 363/74 |
| 2010/0100752 A1 * | | 4/2010 | Chueh et al. .................. 713/320 |

OTHER PUBLICATIONS

Y.F. Chueh et al., U.S. Appl. No. 12/252,414, filed Oct. 16, 2008, entitled System and Method for Managing Power Consumption of an Information Handling System.

* cited by examiner

*Primary Examiner* — Ryan Stiglic

(74) *Attorney, Agent, or Firm* — Hamilton & Terrile, LLP; Robert W. Holland

(57) ABSTRACT

A power manager of an information handling system selectively commands a first or second source voltage from an AC-to-DC adapter based upon power consumption of the information handling system. A lower direct current voltage is provided during reduced power consumption so that DC-to-DC conversion in a power supply is more efficient. A higher direct current voltage is provided during increased power consumption so that the current required to provide the increased power remains below a threshold current, thus allowing the power system to have components that operate at lower current levels under high power consumption operations yet with increased efficiency during low power consumption operations.

19 Claims, 3 Drawing Sheets

SYSTEM AND METHOD FOR INFORMATION HANDLING SYSTEM POWER MANAGEMENT BY VARIABLE DIRECT CURRENT INPUT

BACKGROUND OF THE INVENTION

1. Field of the Invention

The present invention relates in general to the field of information handling system power management, and more particularly to a system and method for information handling system power management by variable direct current input.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems perform a wide variety of functions that consume different amounts of power. For example, simple web browsing or e-mail functions typically consume relatively little power while more computationally intensive functions tend to consume more power, such as running math applications or playing games. Power consumption also increases with the use of peripheral devices, such as playing movies in an optical drive. Generally, information handling systems have power supplies that are capable of providing power to operate components at their highest power consumption levels. Power supplies generally accept power from an external alternating current source, convert the power to a set direct current voltage level and then supply power to components through power rails that carry power direct current voltage adapted to components of the power rail. As an example, an AC-to-DC power adapter converts 120 VAC provided at an outlet to 12 VDC and then a power supply converts the 12 VDC to 5, 3 or 1.5 VDC that are used by components, such as CPUs or chipsets. Desktop information handling systems typically include the AC-to-DC converter in the housing that holds other electronic components while portable information handling systems typically use an external AC-to-DC converter that connects to the housing with a cable that provides a DC Voltage.

Over time, information handling system components have developed improved processing capabilities, however, these greater processing capabilities have often meant increased power consumption. For a number of reasons, increased power consumption has had the greatest impact on portable information handling systems. One reason for this is that portable information handling systems are designed to run on internal batteries so that greater power consumption means reduced battery charge life. Another reason is that portable information handling systems operate on external power with a DC voltage cable coupled to the system housing. In systems that have relatively low power consumption, the external AC-to-DC adapter operates at 12 or 14.5 VDC, however, in systems with greater power consumption, such as power consumption of 90 Watts or greater, the external AC-to-DC adapter typically operates at a higher voltage in order to reduce the current needed for a given power consumption, such as at 19.5 VDC. For example, operating at 19.5 VDC instead of 12 VDC allows current of 4.6 A instead of 7.5 A. The lower current used with higher voltage levels allows for a smaller diameter cable between the AC-to-DC adapter as well as smaller DC connectors and parts with reduced current ratings at the power input loop of the power supply within the information handling system. A disadvantage to the use of a higher DC Voltage input is that DC-to-DC converters of the information handling system tend to operate less efficiently at the higher Voltage levels.

SUMMARY OF THE INVENTION

Therefore a need has arisen for a system and method which manages information handling system power consumption with variable direct current voltage inputs.

In accordance with the present invention, a system and method are provided which substantially reduce the disadvantages and problems associated with previous methods and systems for managing information handling system power consumption. Voltage output from an AC-to-DC adapter is adjusted based on the power consumption of an information handling system to maintain current below a desired threshold yet conserve power with reduced voltage outputs when power consumption allows.

More specifically, an information handling system has plural electronic components that consume direct current power. A power manager of the information handling system monitors power consumption by the electronic components and adjusts the direct current source voltage provided from the adapter. If power consumption exceeds a threshold, such as a current threshold, then the power manager commands the adapter to output an increase direct current voltage. If power consumption falls below a threshold, such as a current threshold, then the power manager commands the adapter to output a decreased direct current voltage. The decrease direct current voltage level allows for improved efficiency of DC-to-DC converters that convert the source voltage provided from the adapter to destination voltages for use by the electronic components.

The present invention provides a number of important technical advantages. One example of an important technical advantage is that direct current voltage input to an information handling system power supply has a lower voltage level for low power consumption levels that improves system efficiency and a higher voltage level for high power consumption levels that maintains input current below a desired threshold. With lower direct current voltage inputs, DC-to-DC power conversion has improved efficiency compared to higher direct current voltage inputs. When system power consumption increases, a higher direct current voltage input allows supply of increased power while maintaining a reduced current level so that power subsystem components designed for reduced current levels will operate at higher power consumption levels. In various embodiments and at various power consumptions, information handling systems that reduce voltage from an adapter to 14 VDC from 19.5 VDC save as much as approximately 30% of power consumption.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Managing direct current source voltage provided to an information handling system aids in efficient conversion to destination voltages used by electronic components with reduced power consumption operation while maintaining current within a desired threshold during high power consumption operation. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
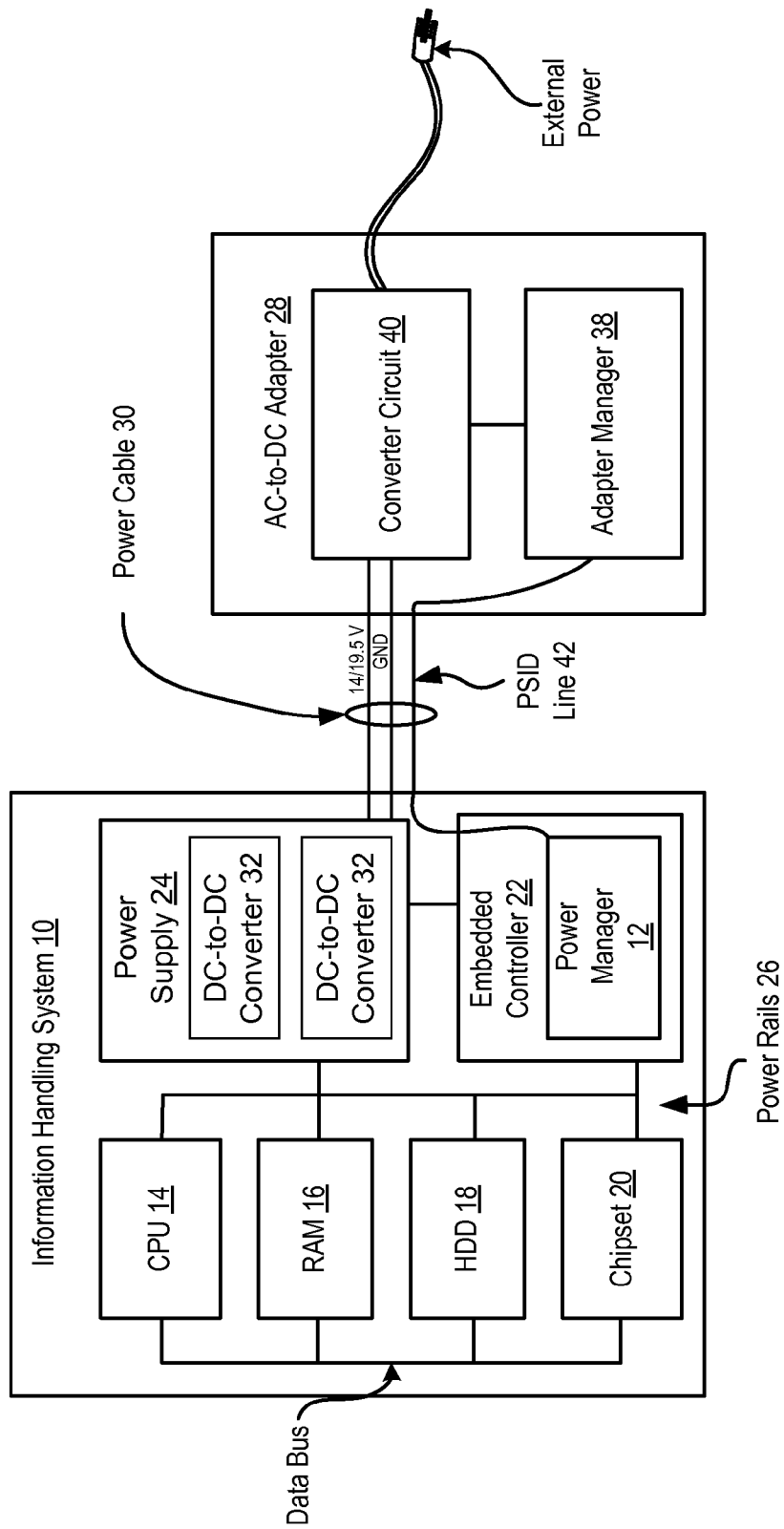
FIG. 1 depicts a block diagram of an information handling system having a power manager that manages power consumption by varying direct current voltage provided to an information handling system.

Referring now to FIG. 1, a block diagram depicts an information handling system 10 having a power manager 12 that manages power consumption by varying direct current voltage provided to information handling system 10. Information handling system 10 has a plurality of electronic components that cooperate to process information, such as a CPU 14, RAM 16, a hard disk drive 18, a chipset 20 and an embedded controller 22, also sometimes referred to as a keyboard controller. The electronic components operate with power provided from a power supply 24 through power rails 26. Power supply 24 accepts power from an AC-to-DC adapter 28 through a power cable 30 at a source direct current voltage and converts the source direct current voltage to one or more destination direct current voltages with DC-to-DC converters 32. The destination direct current voltages provided through power rails 26 are typically between 5 and 1.5 VDC required by the electronic components. As depicted by FIG. 1, the electronic components are disposed in a housing 34 along with a display 36 in a portable information handling system configuration that has AC-to-DC adapter 28 separate from housing 34 and connected by to power supply 24 with an external power cable 30. In desktop or other non-portable information handling system configurations, AC-to-DC adapter 28 may be integrated within the same housing 34 as the electronic components.

In operation, power manager 12 manages power consumption of information handling system 10 by managing the source direct current voltage provided from AC-to-DC adapter 28 to power supply 24. During operations with reduced power consumption, such as approximately 60 Watts or less, power manager 12 commands AC-to-DC adapter 28 to output a reduced direct current voltage, such as 14 VDC, so that DC-to-DC converters 32 operate with greater efficiency than is available at higher source direct current voltages. For example, power manager 12 is firmware running on embedded controller 22 that communicates through power cable 30 with an adapter manager 38. During operations at information handling system 10 that consume approximately 60 Watts or less, power manager 12 sends a signal to adapter manager 38 through power cable 30 to output a reduced source voltage from converter circuits 40, such as 14 VDC. As power consumption increases at information handling system 10 to approximately 60 Watts or greater, power manager 12 commands an increased source voltage, such as 19.5 VDC. Although the increased source voltage causes DC-to-DC converters 40 to operate with less efficiency, the higher source voltage allows greater power with a decreased current so that power components may have less robust features than would be required for the same amount of power provided at the reduced source voltage and resulting increased current. For example, power manager 12 maintains the reduced source voltage of approximately 14 VDC until current through cable 30 reaches a 4.3 Amp threshold. Once the current threshold is met, power manager 12 commands the higher source voltage, such as 19.5 VDC, which has a decreased current. If current across cable 30 decreases below another current threshold during operation at the higher source voltage, such as approximately 4 Amps, then power manager 12 commands a decrease in source voltage to take advantage of power savings available from efficiencies in DC-to-DC conversion from the lower source voltage to the destination voltages. During changes in the source voltage, power supply 24 continues to provide the destination voltage to the electronic components so that the components continue to operate normally.

Figure 2:
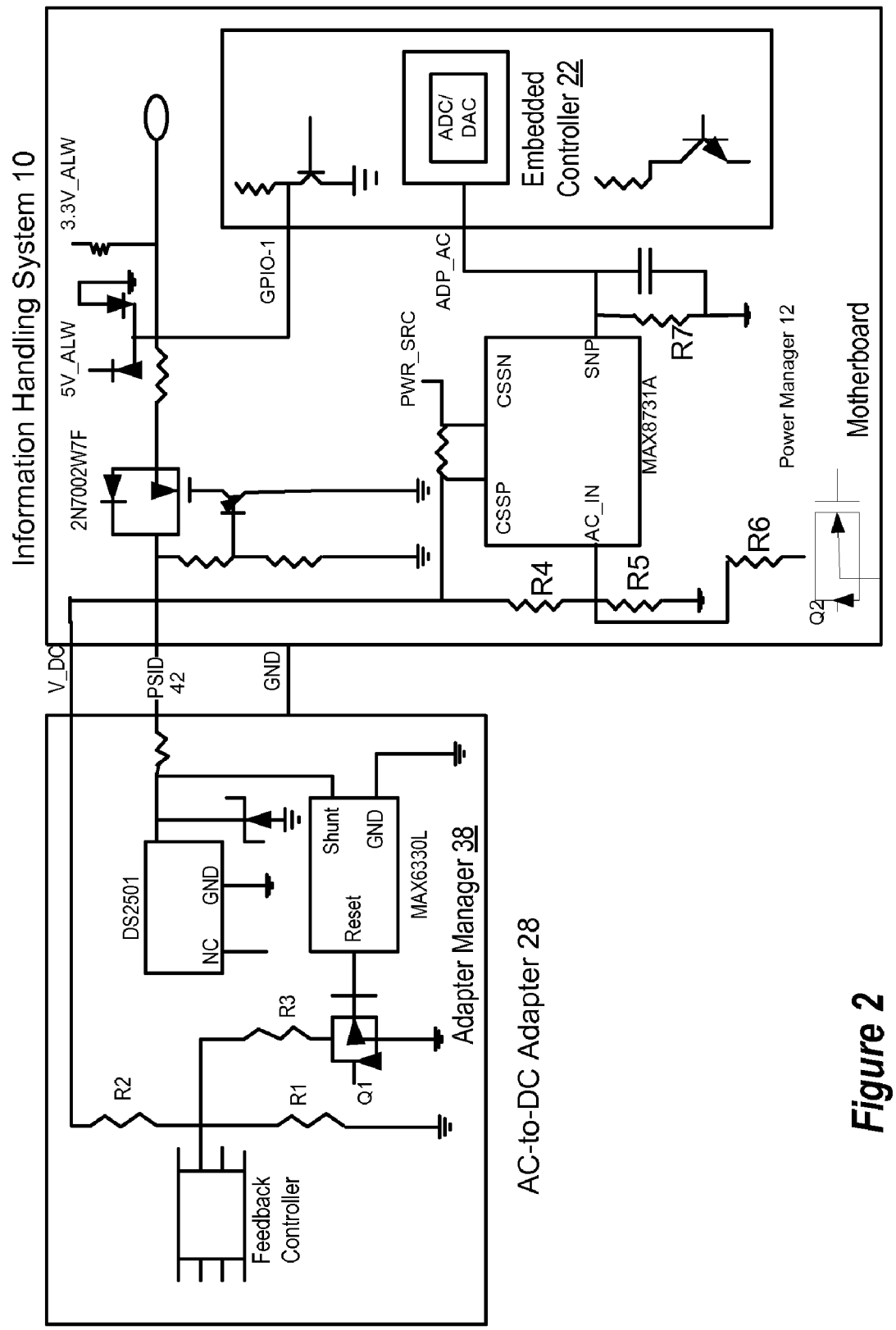
FIG. 2 depicts a circuit diagram of system that coordinates variations in direct current voltage provided to an information handling system to manage power consumption by electronic components of the information handling system.

Referring now to FIG. 2, a circuit diagram depicts a system that coordinates variations in direct current voltage provided to an information handling system 10 to manage power consumption by electronic components of the information handling system. AC-to-DC adapter 28 has a power manager 38 that monitors a PSID line 42 to determine the amount of direct current voltage to output. If PSID line 42 has a low value, then the output at V_DC equals $(1+R2/R1)*2.5$ and the value at V_DC is set at 13.5 VDC. If PSID line 42 has a high value, then the output at V_DC equals $(1+R2/(R1/R3))*2.5$ and is set at 19.5 VDC. The signal sent across PSID 42 to set V_DC is determined by power manager 12 based on the current that passes through V_DC. V_ACIN is set at $(1+R4/R5)*2.048$ sets a threshold of 16.8V to set PSID high. V_ACIN is set at $(1+R4/(r5/R4))*2.048$ sets a threshold of 12V to set PSID low. In summary, if power consumption increases above a set threshold while V_DC is 13.5 VDC, then PSId 42 signals high to increase the voltage output by adapter 20 to 19.5 VDC. If power consumption decreases below a set threshold while V_DC is set at 19.5 VDC, then PSID 42 signals low to decrease the voltage output by adapter 20 to 13.5 VDC.

Figure 3:
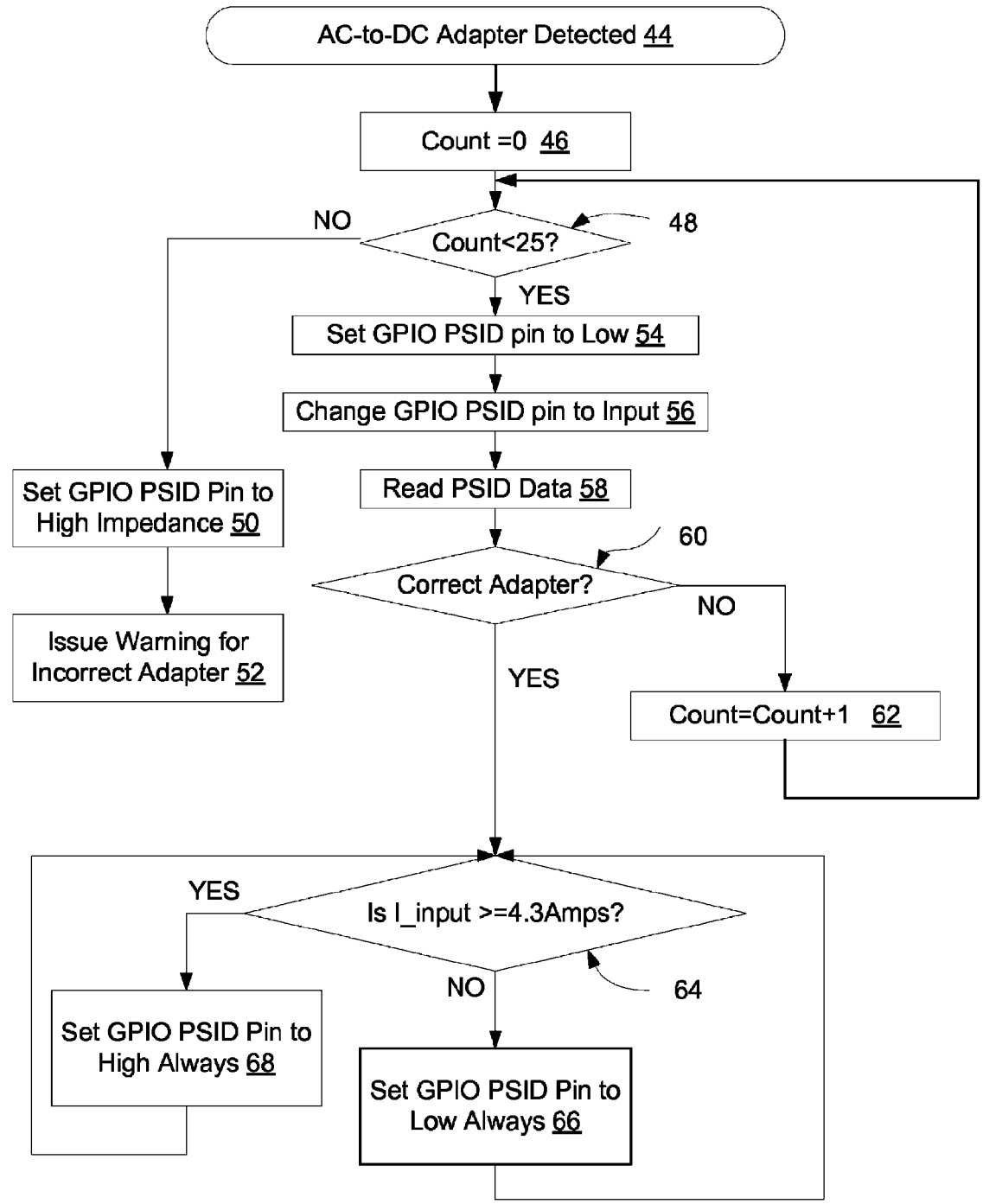
FIG. 3 depicts a flow diagram of a process for managing direct current source voltage provided to an information handling system for conversion to destination voltages used by electronic components of the information handling system.

Referring now to FIG. 3, a flow diagram depicts a process for managing direct current source voltage provided to an information handling system for conversion to destination voltages used by electronic components of the information handling system. The process begins at step 44 when an AC-to-DC adapter is detected connected to the information handling system. A counter is zeroed at step 46 and at step 48 a determination is made of whether a count is less than 25. If the count is less than 25, the process continues to step 50 to set the GPIO PSID pin to a high impedance and to step 52 to issue a warning that the adapter is not a correct adapter for the information handling system. If the count is less than 25 at step 48, the process continues to step 54 to set the GPIO PSID pin to a low value a short time, such as ten microseconds. At step 56, the GPIO PSID pin is changed to an input and at step 58 data is read from the PSID line to determine the identification of the adapter. If at step 60 the adapter is not a correct adapter for the information handling system, the process continues to step 62 to increment the counter and returns to step 48 to attempt to read PSID data again. If the adapter is a correct adapter for the information handling system, the process continues to step 64. This process of identification of the adapter is performed in a conventional manner.

Once the adapter is identified as correct for the information handling system and capable of outputting varying direct current source voltages, the process continues to step 64 to compare the current provided from the adapter with a current threshold, such as 4.3 Amps. If the current is greater than or equal to 4.3 Amps, the process continues to step 68 to step the GPIO PSID pin to high always so that the adapter outputs a high source voltage, such as 19.5 VDC. If the current is less than 4.3 Amps, the process continues to step 66 to set the GPIO PSID pin to low always so that the adapter outputs a low source voltage, such as 13.5 VDC. The process iterates back to step 64 to periodically compare the current provided from the adapter and to adjust the output source voltage so that the current does not exceed a predetermined threshold.

Although the present invention has been described in detail, it should be understood that various changes, substitutions and alterations can be made hereto without departing from the spirit and scope of the invention as defined by the appended claims.

What is claimed is:

1. An information handling system comprising:
    plural electronic components operable to cooperate to process information, the electronic components consuming direct current power at one or more destination voltages;
    a power supply interfaced with the plural electronic components and operable to accept direct current at a source voltage and supply the direct current to the electronic components at one or more destination voltages associated with the electronic components;
    a power adapter operable to accept alternating current from an external power source and convert the alternating current to a first or second constant source voltage for use by the power supply, wherein the second constant source voltage is greater than the first constant source voltage; and
    a power manager interfaced with the power supply and the power adapter, the power manager operable to monitor a power consumption level of the electronic components and to command the first constant source voltage for a first power consumption level and the second constant source voltage for a second power consumption level at a predetermined power consumption threshold, wherein the second power consumption level is greater than the first power consumption level and wherein increasing from the first constant source voltage to the second constant source voltage decreases current provided by the power adapter.

2. The information handling system of claim 1 further comprising a housing that houses the electronic components, the power supply, the power adapter and the power manager.

3. The information handling system of claim 1 further comprising a housing that houses the electronic components and the power supply, the power adapter residing external to the housing and interfaced with the power supply through a cable.

4. The information handling system of claim 1 wherein the power manager comprises an embedded controller.

5. The information handling system of claim 1 wherein the first constant source voltage comprises 14 VDC and the second constant source voltage comprises 19.5 VDC.

6. The information handling system of claim 1 wherein the first power consumption level comprises less than 60 W and the second power consumption level comprises more than 60 W.

7. The information handling system of claim 1 wherein the power manager command the first constant source voltage and second constant source voltage to maintain current below a predetermined threshold.

8. The information handling system of claim 7 wherein the predetermined threshold comprises approximately 4.3 Amps.

9. A method for information handling system power management, the method comprising:
    converting alternating current to direct current at a first source voltage and a first current;
    providing the first source voltage and first current to an information handling system power supply;
    converting the first source voltage with the power supply to one or more direct current destination voltages;
    powering electronic components of the information handling system with the one or more direct current destination voltages;
    detecting a predetermined condition at the information handling system, the predetermined condition comprising at least power consumption greater than a predetermined level at the information handling system;
    converting the alternating current to direct current at a second source voltage and second current in response to the predetermined condition, wherein the second source voltage is greater than the first source voltage and the second current is less than the first current;
    providing the second source voltage and second current to the power supply;
    converting the second source voltage with the power supply to the one or more direct current destination voltages; and
    powering the electronic components of the information handling system with the one or more direct current destination voltages.

10. The method of claim 9 wherein the converting alternating current to a source voltage and the converting source voltage to a destination voltage are performed within a common information handling system housing.

11. The method of claim 9 wherein converting alternating current is performed by an adapter external to a housing that contains the information handling system electronic components.

12. The method of claim 9 further comprising communicating detection of the predetermined condition from the power supply to an adapter through a power cable, the adapter performing the converting alternating current.

13. The method of claim 9 further comprising communicating detection of the predetermined condition from an adapter to the power supply through a power cable, the adapter performing the converting alternating current.

14. A system for managing power to an information handling system, the system comprising:
- an AC-to-DC adapter operable to convert alternating current to direct current at first and second source voltages, the second source voltage greater than the first source voltage;
- a power supply operable to convert the first and second source voltages to one or more destination voltages for use in powering electronic components of the information handling system; and
- a power manager interfaced with the AC-to-DC adapter, the power manager operable to command the first source voltage if current draw from the AC-to-DC adapter is less than a predetermined amount at the first source voltage and to command the second source voltage if current draw from the AC-to-DC adapter is greater than the predetermined amount at the first source voltage, wherein the command for the second source voltage reduces the current draw for a predetermined power consumption.

15. The system of claim 14 wherein the predetermined conditions comprise the power consumption of the electronic components.

16. The system of claim 14 further comprising a cable connecting the AC-to-DC adapter and power supply, wherein the current draw comprises a predetermined current through the cable.

17. The system of claim 14 wherein the first and second source voltages comprise 14 VDC and 19.5 VDC.

18. A method for powering an information handling system, the method comprising:
- converting alternating current to direct current at a first constant voltage;
- powering the information handling system at the first constant voltage and a variable current;
- detecting a threshold current value at a predetermined power consumption level;
- in response to detecting, converting the alternating current to direct current at a second constant voltage; and
- powering the information handling system at the second constant voltage and a variable current;
- wherein at the predetermined power consumption level the second constant voltage is greater than the first constant voltage and the current associated with the second constant voltage is less than the current associated with the first constant voltage.

19. The method of claim 18 further comprising:
- detecting a reduction below a second threshold current at a second predetermined power consumption level;
- in response to detecting, reducing the converting from the second constant voltage to the first constant voltage and increasing the current to provide the second predetermined power consumption level.

* * * * *